Nov. 12, 1963   A. B. BASSOFF   3,110,132
HIGH PRODUCTION GEAR GRINDER
Filed Jan. 23, 1961   2 Sheets-Sheet 1

INVENTOR.
ARTHUR B. BASSOFF
BY
ATTORNEYS

Nov. 12, 1963    A. B. BASSOFF    3,110,132
HIGH PRODUCTION GEAR GRINDER
Filed Jan. 23, 1961    2 Sheets-Sheet 2
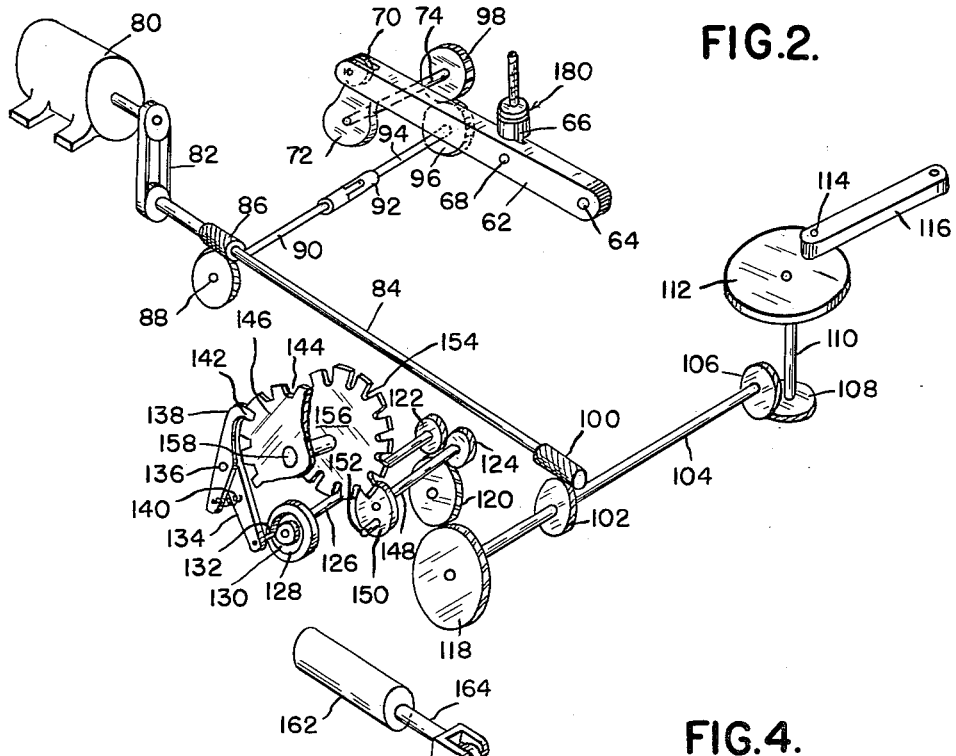
FIG.2.
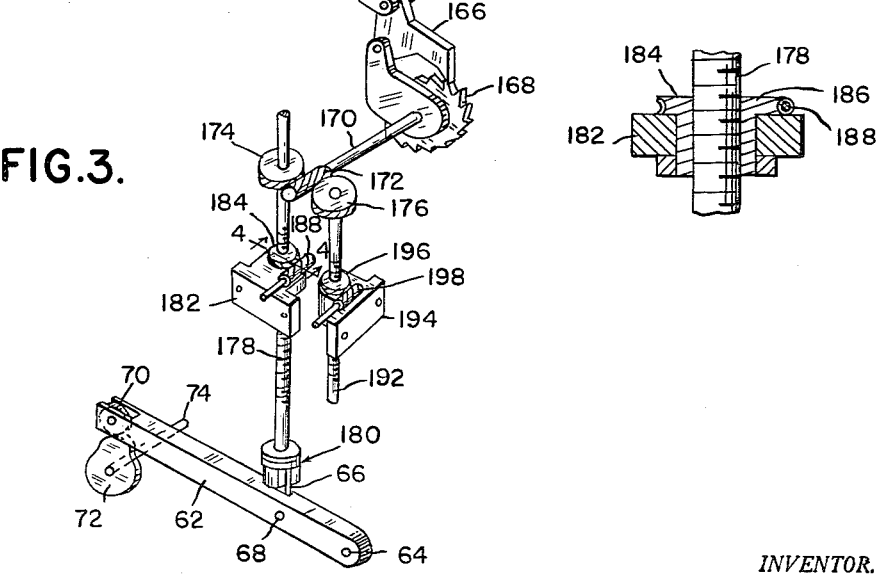
FIG.3.
FIG.4.
*INVENTOR.*
ARTHUR B. BASSOFF
BY Whittemore,
Hulbert & Belknap
ATTORNEYS United States Patent Office 3,110,132
Patented Nov. 12, 1963

3,110,132
HIGH PRODUCTION GEAR GRINDER
Arthur B. Bassoff, Detroit, Mich., assignor to National Broach & Machine Company, Detroit, Mich., a corporation of Michigan
Filed Jan. 23, 1961, Ser. No. 84,264
25 Claims. (Cl. 51—95)

The present invention relates to a high production gear grinder.

It is an object of the present invention to provide a high production gear grinder capable of fully automatic production.

More specifically, it is an object of the present invention to provide a high production gear grinder including automatic loading mechanism, automatic wheel trimming mechanism, automatic indexing mechanism, automatic downset mechanism, and automatic traverse mechanism, all inter-related and powered from a single source in suitably timed relation.

It is a further object of the present invention to provide a fully automatic high production gear grinding machine including a single power source, and mechanical connections from said source to table reciprocating means, and indexing means to effect indexing in properly timed relation to traverse strokes.

More specifically, it is an object of the present invention to provide wheel positioning means for moving a grinding wheel generally radially with respect to a work piece, in combination with traverse mechanism for effecting relative traverse strokes between the grinding wheel and work gear axially of the gear, and index means operable to index a work gear at one or both ends of a traverse stroke.

It is a further object of the present invention to provide automatic traverse and index mechanism in a gear finishing machine, in combination with wheel positioning means for effecting retraction of the wheel from the work at the end of a stroke to permit automatic indexing with a minimum of lost time.

Other objects and features of the invention will become apparent as the description proceeds, especially when taken in conjunction with the accompanying drawings, illustrating a preferred embodiment of the invention, wherein:

FIGURE 1A is an enlarged fragmentary view of a detail of the construction of FIGURE 1.

FIGURE 2 is a fragmentary diagrammatic view in perspective, showing the drive motor and actuating mechanism connected thereto.

FIGURE 3 is a diagrammatic perspective view showing the wheel trimming and downset mechanism.

FIGURE 4 is a fragmentary sectional view on the line 4—4, FIGURE 3.

Figure 1:
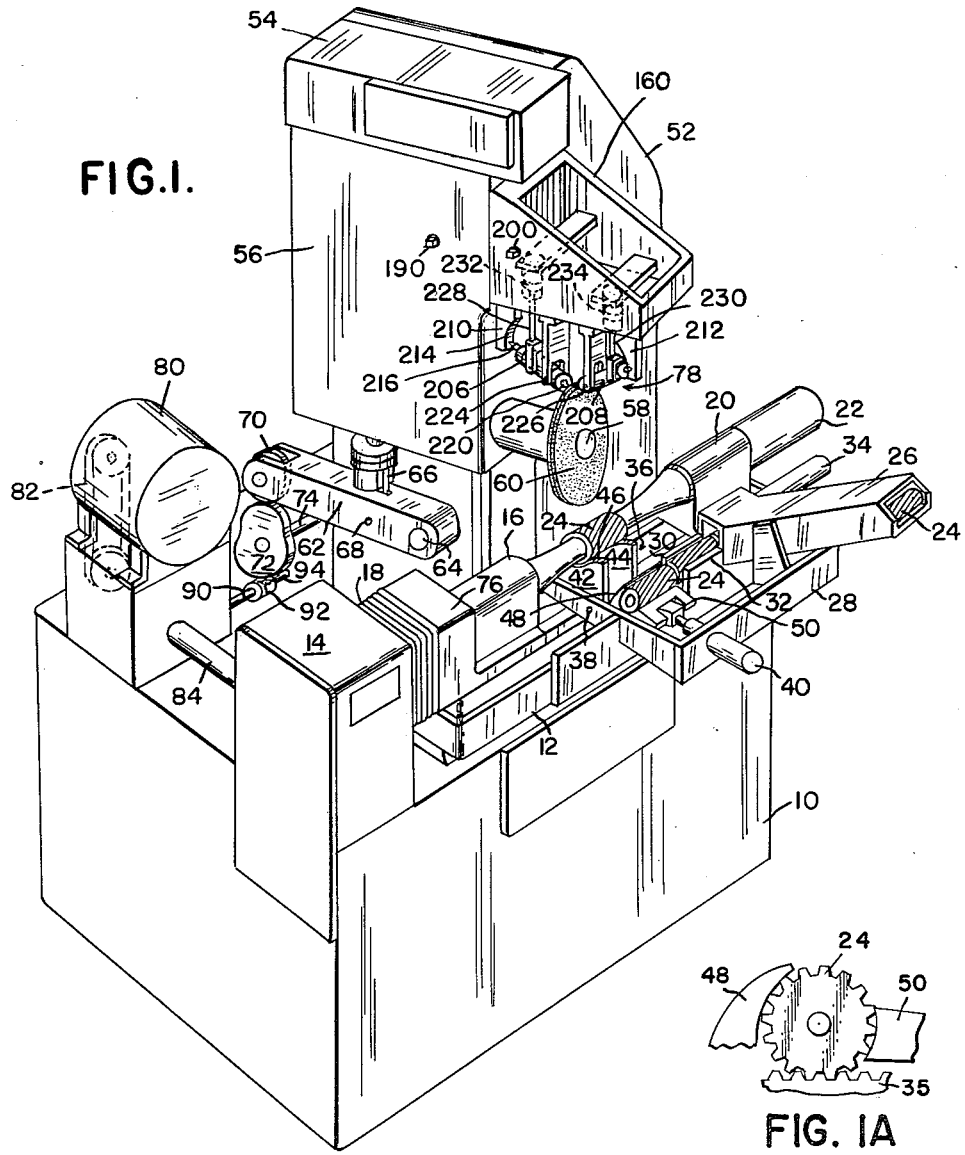
FIGURE 1 is a perspective view of the high production gear grinding machine.

Referring first to FIGURE 1, the grinder comprises a base 10 having a reciprocating work table or slide 12 mounted for horizontal rectilinear reciprocation on ways provided on the top of the base 10. Mechanical means are provided for effecting reciprocation of the table as will subsequently be described, and include connecting means extending between the base 10 and the table 12. Means are provided for indexing a work gear carried by the grinder and this means includes index mechanism contained within the index head 14 and extending to the work headstock 16, and is protected by the collapsible bellows 18. The work table 12 is provided with a tailstock 20 which is power operated and includes a work engaging center moved axially by a piston received in an air cylinder 22.

The machine as illustrated is set up for grinding a sequence of cylindrical work gears 24 one of which is shown in position between the headstock 16 and the power tailstock 20. Movable with the table 12 is an inclined chute or magazine 26 in which a plurality of work gears 24 are positioned and are adapted to move downwardly by gravity. Automatic loading mechanism indicated generally at 28 is provided. The details of this automatic loading mechanism form no part of the present invention but in general, it comprises guide plates 30 and 32 between which gears are advanced endwise by the piston of an air cylinder feeding device 34. As the gears 24 are advanced longitudinally they are engaged with a rack 35 at their underside which positions the gears in accurately located rotational position so that tooth spaces therein will coincide with the grinding wheel or grinding wheels after the work pieces have been clamped between centers of the head and tailstocks. The automatic loading device comprises a pivoted carrier indicated generally at 36 mounted for rocking movement about the axis of a pivot mounting 38 and adapted to be moved by the piston of an air cylinder device 40. The carrier 36, for the particular gear shown, comprises rails 42 and 44 having surfaces 46 concentric with the axis of pivot mounting 38 and positioned so as to permit clockwise movement of the carrier to the position shown after a work gear 24 has been clamped between centers. The carrier also includes a movable jaw 48 associated with an end portion 50 of the carrier which receives a work gear from the aligned series of gears extending from the chute 26. The carrier 36 includes a portion of the rack 35 which, with the parts in the position illustrated in FIGURE 1, is aligned with the rack located between the guide plates 30 and 32. When air is admitted to the cylinder 40 to swing the carrier in a counterclockwise direction, following release of the finished work gear by the centers of the head and tailstocks, the finished gear is contained in recesses located at the ends of the rails 42 and 44 and is rolled into a discharge chute. At the same time, the next work gear is moved into position between the centers and at this time is retained in accurately indexed or rotated position by its continuing engagement with the rack section 35 located between the jaw 48 and the end or anvil portion 50 of the carrier 36. The centers are then advanced to clamp the work gear in accurately rotated position. The jaw 48 is movable relative to the carrier and the carrier is then rotated clockwise, the jaw 48 moving under the gear retained between centers and returning to the position illustrated in the figure.

The gear grinder includes an adjustable column 52 having at one side thereof a laterally extending housing 54. Mounted in vertical ways on the column 52 is a wheel head slide 56 having a wheel spindle 58 extending therefrom carrying one or a pair of gear grinding wheels 60 as desired. Suitable driving means for the spindle 58 is included and is preferably mounted within the wheel head slide.

It will of course be understood that the column 52 is angularly adjustable about a vertical axis to cause the axis of the wheel spindle 58 to extend at an oblique angle with respect to the axes of the head and tailstocks where the grinding operation is performed on a helical gear. Of course, if the gear is a spur gear the column is adjusted so that the axis of the wheel spindle 58 is perpendicular to the axes of the head and tailstocks. Such an arrangement is illustrated in prior patent to Praeg No. 2,524,541.

Vertical movement of the wheel head slide 56 is provided by means of a lever 62 pivoted as indicated at 64 to the column 52. Intermediate its ends the lever 62 has a link 66 pivoted thereto as indicated at 68, the upper end of the link being connected to the vertical screw which fits the nut in wheel slide 56. At its outer end the lever 62 carries a roller 70 which engages the upper surface of a cam 72. The cam 72 is mounted on a spindle 74 extending into the column 52 and is driven in timed relation to the operation of the motor as will subsequently be described. It will of course be apparent that as the cam rotates a cam rise results in clockwise rotation of the lever 62 and hence, upward movement of the wheel slide 56.

When the grinder is employed in grinding helical gears conventional lead bar mechanism is included, as for example in a lead bar head 76.

In addition to the foregoing, a completely automatic gear grinder requires means for effecting periodic trimming of the grinding wheel or ginding wheels, in conjunction with means for effecting a relative adjustment between the trimmed wheel and the work support. In other words, if the wheel is trimmed to remove a certain amount of stock from the wheel, the wheel in the present instance requires a corresponding downset so that the removal of stock from the wheel is compensated for. This mechanism is indicated generally in FIGURE 1 at 78 and will be described in detail at a later point.

Referring now to FIGURE 2 there is diagrammatically illustrated the driving mechanism which comprises a motor 80 connected by belting 82 to a main drive shaft 84. The drive shaft 84 includes a worm 86 in mesh with a worm gear 88 carried by a shaft 90. The shaft 90 is coupled by a universal joint 92 to a shaft 94 which extends into the adjustable column 52. In the diagrammatic showing of FIGURE 2 only a pair of shafts 90 and 94 are shown, but it is to be appreciated that an additional universal joint such as the universal joint 92, may be provided together with longitudinally slidable splined shafts to accommodate the movement between the worm gear 88 and a driving gear 96 carried within the angularly adjustable column 52. The gear 96 is in mesh with a gear 98, the gears 96 and 98 being used to establish the correct timing between cam rotation and crankshaft rotation only, and are located as shown so that the cam becomes accessible for easy replacement for different crowns as required. The gear 98 is connected by the shaft 74 to the cam 72.

Traverse mechanism for the work slide comprises the shaft 84 which carries a second worm 100 which is in mesh with a worm gear 102 carried by a shaft 104. At one end the shaft 104 is connected by beveled gears 106 and 108 to a shaft 110 which carries a crank disc 112 having a crank pin 114 connected to a connecting rod 116, the other end of which is connected to the table 12. Obviously, complete rotation of the crank disc 112 will result in a complete back and forth reciprocation of the work table 12.

The shaft 104 carries a gear 118 which drives an idler gear 120 which meshes with a pair of gears 122 and 124. The gear 122 drives a shaft 126 carrying a cam 128 having a cam slot 130 therein which receives a pin 132 of a pawl actuating arm 134. The pawl actuating arm is pivoted as indicated at 136 and has an independently pivoted locking pawl 138 connected thereto and biased in locking direction by a compression spring 140. The locking pawl 138 has a nose 142 receivable in one of the index recesses 144 of an index plate 146.

The gear 124 is connected by a shaft 148 to an index plate driving disc 150 having a pin 152 movable into and out of recesses 154 in a Geneva plate 156 fixed to a shaft 158 which is also fixed to the index plate 146. The cam slot 130 is so shaped and timed with respect to the Geneva actuating pin 152 as to retract the nose 142 of the pawl so as to permit rotation of the Geneva plate and index plate as a result of movement of the pin 152 into and out of operating engagement with one of the slots 154 of the Geneva plate, after which the pawl returns to engaged position. As a result of the spring 140 the pawl seats firmly into the index recess and thus accurately locates the index plate and hence the work gear which is ultimately connected thereto.

Indexing occurs only at one end of the table stroke because it is desired to have the wheel make two passes through the work, a pass in one direction removing the bulk of the stock while the return pass is corrective in action.

Referring now to FIGURES 1 and 3, the wheel trimming mechanism is illustrated in detail. The wheel trimming mechanism is carried by a wheel dresser slide 160 which is mounted for vertical movement on the wheel slide 56.

Mounted within the downset drive housing 54 is an air cylinder 162 having a piston therein connected by a connecting rod 164 to a pawl 166 adapted to effect step by step rotation of a ratchet wheel 168. The ratchet wheel 168 is connected to a shaft 170 and carries a worm 172 which is in simultaneous mesh with worm gears 174 and 176 both of which are mounted for rotation in the downset drive housing 54 and retained therein against axial displacement by suitable thrust bearings (not shown).

The worm gear 174 has a splined connection to a threaded shaft or screw 178 the lower end of which is connected by a coupling 180 to the link 66 which in turn is connected to the lever 62. The threaded shaft 178 is engaged in a wheel slide nut housing 182, this wheel slide nut housing 182 being bolted or otherwise rigidly secured to the inner surface of the wheel head slide 56. The wheel slide nut housing 182, as best seen in FIGURE 4, has rotatably received therein a nut 184 which threadedly engages the intermediate threaded portion of the shaft 178 but which is retained against axial movement relative to the housing 182. The nut 184 includes a radially extending flange portion 186, the periphery of which is formed with worm gear teeth which mesh with a worm 188 having a portion extending through the wall of the wheel head slide 56 and there provided with a squared portion 190 as best seen in FIGURE 1.

With this relationship it will be observed that rotation of the worm 188 by a tool engaged with the exterior squared portion 190 thereof, will effect rotation of the nut 184. At this time the threaded shaft 178 is held against rotation by its engagement with the worm 172 and hence, rotation of the nut will effect relative vertical movement between the wheel slide nut housing 182 and the shaft 178. The weight of the wheel head slide 56 however, insures that this adjustment results in vertical movement of the wheel head slide.

The gear 176 is fixed to a threaded shaft 192. Fixed to a wall of the wheel dresser slide 160 is a dresser nut housing 194 having a dresser nut 196 carried thereby for rotation but prevented from moving axially with respect thereto. The construction of the wheel slide nut housing and dresser nut housing may be identical. The dresser nut 196 also includes a laterally extending flange portion provided with peripheral worm gear teeth in mesh with a worm 198 having an actuating shaft extending to the exterior of the wheel dresser slide 160 and there provided with a squared end portion 200 for engagement with a suitable tool.

It will be observed that rotation of the worm 198 by engagement of a tool with the squared end portion 200 of the worm will result in rotation of the dresser nut 196. At this time the threaded shaft 192 is held against rotation by engagement between the worm 172 and worm gear 176. Accordingly, rotation of the dresser nut will result in independent vertical adjustment of the wheel dresser slide 160.

When the worms 188 and 198 are stationary, step by step or incremental rotation of the shaft 170 by the pivot ratchet mechanism driven by the air cylinder 162, will effect simultaneous rotation of the threaded shafts 178 and 192. Rotation of the shaft 192 will result in predetermined downward movement of the wheel dresser slide 160, and subsequent operation of the wheel dressers, as will be described, removes a predetermined amount of material from the grinding wheel or grinding wheels 60. This, without further adjustment of parts, would of course result in grinding the next gear oversize. Accordingly, to compensate for stock removal from the wheel it is necessary to provide a corresponding downset of the wheel head slide 56. This is accomplished by rotation of the shaft 178 in the nut 134.

Inasmuch as the downset of the wheel head slide and the wheel dresser slide are both gauged with reference to the stationary housing 54, it will be understood that equal downward movement of the two slides results in maintaining the lower peripheral portion of the wheel or wheels at the correct level. Thus, for example, when the trimmer is fed down on slide 56 by .001" the bottom of the wheel rises .001" above previous position because the wheel is reduced .001" in radius. Therefore, slide 56 must be fed down on column 52 by .001" to reestablish grind size.

Referring again to FIGURE 1, the wheel trimming mechanism comprises a pair of pivoted holders 206 and 208 mounted respectively on adjustable slides 210 and 212. The slide or carrier 210 has a template surface 214 and the slide or carrier 212 has a corresponding template surface which is not visible in the figure but which confronts the template surface 214. The holders 206 include spring biased slidable elements having template followers 216 rigidly connected to diamond trimmers 220. The holders 206 and 208 are pivoted as indicated respectively at 224 and 226 and are connected by links 228 and 230 to air cylinders 232 and 234 respectively. When air is admitted to the cylinders 232 and 234 the diamonds are caused to sweep in paths as determined by the shape of the template surfaces.

With the foregoing general description in mind it will be noted that mechanical synchronization is effected from a single drive motor 80 by providing for mechanical reciprocation of the table through the agency of the crank pin 114, by providing for mechanical indexing through the Geneva drive, and timed pawl actuation of the indexing mechanism, and by providing a mechanical coupling to the mechanism for effecting vertical movement of the wheel head slide in timed relation to table travel, as desired.

At this point it may be noted that the cam 72 may be arranged to provide for vertical movement of the wheel or wheels out of engagement with the work gear substantially instantaneously upon completion of a traverse stroke, at either end thereof, without requiring the additional stroke necessary to move the wheel out of interference with the gear by continued horizontal travel of the gear. It will also be observed that by appropriately shaping the cam 72, a vertical movement may be imparted to the wheel during the traverse stroke so as to impart a crowned contour to the gear teeth if desired.

Automatic loading and unloading of gears is accomplished by timed actuation of air cylinders 34 and 22 so as to provide for automatic removal of a finished ground work gear from the machine and for replacement of a new gear between the centers in properly located or stock divided position.

In addition to the foregoing, the trimming mechanism may be actuated at intervals, preferably during automatic loading and unloading of a gear by timed actuation of the air cylinders 162, 232 and 234.

With the foregoing description in mind it will be observed that the machine is fully automatic in operation and will produce finished ground work gears without attention from an operator except to see that a supply of unfinished gears remains at all times in the chute 26.

The drawings and the foregoing specification constitute a description of the improved high production gear grinder in such full, clear, concise and exact terms as to enable any person skilled in the art to practice the invention, the scope of which is indicated by the appended claims.

What I claim as my invention is:

1. A gear grinding machine comprising a frame, a work slide mounted for rectilinear movement on said frame, a rotatable work support on said work slide, a rotary grinding wheel support, a wheel slide mounting said grinding wheel support for movement on said frame between a working position in which a grinding wheel thereon engages a work gear carried by the rotatable work support and a clearance position in which the grinding wheel is in radial clearance with respect to the work gear on said rotatable work support, cam means including a rotary cam acting between said frame and said wheel slide to effect rapid movement of said wheel slide generally radially of said work support at the end of a stroke of reciprocation of said work slide to provide clearance for indexing, index mechanism connected to said rotatable work support, a motor, mechanical connections between said motor and said work slide to reciprocate said work slide on said frame, and mechanical connections between said motor and said rotary cam to cam said wheel slide quickly to clearance position at the end of a stroke of reciprocation of said work slide to provide for quick indexing of said rotatable work support without the necessity of waiting for clearance between the grinding wheel and work gear to result from continued travel of said work slide.

2. A gear grinding machine as defined in claim 1 comprising an adjustable column on which said wheel slide is mounted for positioning said rotary wheel support at the appropriate angle for grinding helical gears, the mechanical connection between said motor and said wheel slide including flexible coupling mechanism to maintain driving relation to the wheel slide in different angular positions of adjustment thereof.

3. A gear grinding machine as defined in claim 1 including automatic wheel trimming and wheel feeding downset mechanism, and means for actuating said wheel trimming and downset mechanism during the interval when said wheel slide is moved away from said work support.

4. A gear grinding machine as defined in claim 1 comprising automatic loading mechanism operable to remove a finished gear from said rotatable work support and to position a new gear thereon.

5. A gear grinder comprising a frame, a work slide mounted on said frame for reciprocation thereon, a rotary work support on said work slide with its axis parallel to the direction of reciprocation of said work slide, a wheel slide mounted on said frame for movement generally radially of said work support, a rotary wheel support on said wheel slide, index mechanism connected to said work support, a motor on said frame, traverse mechanism connected between said frame and work slide and including a rotary drive element, cam mechanism including a rotary cam connected between said frame and wheel slide, said cam being shaped to effect abrupt withdrawal of a grinding wheel on said wheel support from a work gear on said work support at the end of a stroke of said work slide, and rotary transmission means connecting said motor to said drive element, to said index mechanism, and to said rotary cam.

6. A grinder as defined in claim 5 in which said drive element is a crank.

7. A gear grinder comprising a frame, a work slide mounted on said frame for reciprocation thereon, a rotary work support on said work slide with its axis parallel to the direction of reciprocation of said work slide, a wheel slide mounted on said frame for movement generally radially of said work support, a rotary wheel support on said wheel slide, index mechanism connected to said work support including a continuously rotating drive member, a motor on said frame, traverse mechanism connected between said frame and work slide and including a rotary drive element, cam mechanism including a rotary cam connected between said frame and wheel slide, said cam being shaped to provide rapid withdrawal of a grinding wheel carried by said wheel support from a work gear carried by said work support into clearance position substantially at the end of a grinding stroke of said work slide, and rotary transmission means connecting said motor to said rotating drive member, said drive element, and said rotary cam.

8. A gear grinder comprising a frame, a work slide mounted on said frame for reciprocation thereon, a rotary work support on said work slide with its axis parallel to the direction of reciprocation of said work slide, a wheel slide mounted on said frame for movement generally radially of said work support, a rotary wheel support on said wheel slide, index mechanism connected to said work support including a continuously rotating drive member, a motor on said frame, traverse mechanism connected between said frame and work slide and including a rotary drive element, cam mechanism including a rotary cam connected between said frame and wheel slide, and rotary transmission means connecting said motor to said rotating drive member, said drive element, and said rotary cam, said rotary transmission means being timed to effect back and forth traverse of said work slide followed by rapid radial withdrawal of said wheel slide to clear a work piece, and to effect indexing of said work support while a grinding wheel on said wheel support is separated radially from a gear on said work support.

9. A gear grinder comprising a frame, a work slide mounted on said frame for reciprocation thereon, a rotary work support on said work slide with its axis parallel to the direction of reciprocation of said work slide, a wheel slide mounted on said frame for movement generally radially of said work support, a rotary wheel support on said wheel slide, a rotary wheel compensating nut carried in a fixed position on said wheel slide, a wheel compensating screw shaft engaged in said nut, cam means connected between said frame and wheel compensating screw shaft, a wheel trimmer movably mounted on said wheel slide, a rotary trimmer nut mounted in a fixed position on said trimmer, a trimmer screw shaft engaged in said trimmer nut, and drive means for rotating said trimmer and wheel compensating screw shafts simultaneously.

10. A grinder as defined in claim 9 in which said drive means includes a worm to worm gear connection effective to lock said shafts against rotation except upon energization of said drive means.

11. A gear grinder comprising a frame, a work slide mounted on said frame for reciprocation thereon, a rotary work support on said work slide with its axis parallel to the direction of reciprocation of said work slide, a wheel slide mounted on said frame for movement generally radially of said work support, a rotary wheel support on said wheel slide, wheel compensating mechanism comprising interengaged threaded nut and screw compensating elements one of which is rotatably mounted in fixed position on said wheel slide, cam means connected between said frame and the said one element, a trimmer movably mounted on said wheel slide, trimmer feed mechanism comprising interengaged nut and screw trimmer feed elements one of which is rotatably mounted in fixed position on said trimmer and the other of which is rotatably mounted in fixed position on said wheel slide, and means for effecting simultaneous relative rotation between the nut and screw elements of both of said mechanisms, and separate manually operated means for effecting relative rotation between the nut and screw elements of either of said mechanisms independently of the other.

12. A grinder as defined in claim 11 in which the means for effecting simultaneous relative rotation between the nut and screw elements of both of said mechanisms comprises worm to worm gear devices effective to lock the rotated elements against rotation except when the devices are operated.

13. A grinder as defined in claim 11 in which both of the aforesaid means for effecting the relative rotation between said elements comprises worm to worm gear drives.

14. A gear grinding machine comprising work support means including centers movable toward and away from each other to engage and grip a work gear therebetween, means for supporting a grinding wheel in position to engage a work gear carried between said centers, means for indexing said work support means, a carrier movable to advance a series of work gears from a loading position to a grinding position and to position each work gear in working position in properly indexed relationship, said carrier including teeth engageable in tooth spaces of work gears to determine the angular position of a work gear therein, and clamp means for engaging a work gear to support said work gear during movement from loading position to grinding position.

15. A grinder as defined in claim 14 in which said clamp means includes a releasable jaw to provide for return of said carrier after a work gear carried thereby has been engaged between the centers of the work support means.

16. A gear grinding machine comprising indexable work support means including a pair of centers movable toward and away from each other to grip a work gear therebetween, a movable carrier having a work gear receiving portion movable between a loading position and a grinding position intermediate said centers, a locator in said work gear receiving portion to engage a tooth space of a work gear therein to orient the gear angularly, means to advance an unground gear into said receiving portion while in loading position, means to advance the carrier to position the gear intermediate said centers, and means to advance said centers to grip the work gear therebetween.

17. A gear grinding machine comprising indexable work support means including a pair of centers movable toward and away from each other to grip a work gear therebetween, a movable carrier having a work gear receiving portion movable between a loading position and a grinding position intermediate said centers, a locator in said work gear receiving portion to engage a tooth space of a work gear therein to orient the gear angularly, clamping means on said carrier including a yieldable jaw to engage the work gear in said carrier, means to advance an unground gear into said receiving portion while in loading position, means to advance the carrier to position the gear intermediate said centers, means to advance said centers to grip the work gear therebetween, and means for returning said carrier to position said work receiving portion in loading position after engagement of the work gear by said centers, said jaw yielding to clear the work gear on such return movement.

18. A gear grinding machine comprising indexable work support means including a pair of centers movable toward and away from each other to grip a work gear therebetween, a movable carrier having a work gear receiving portion movable between a loading position and a grinding position intermediate said centers, a locator in said work gear receiving portion to engage a tooth space of a work gear therein to orient the gear angularly, clamping means on said carrier including a yieldable jaw to engage the work gear in said carrier, means to advance an unground gear into said receiving portion while in loading position, means to advance the carrier to position the gear intermediate said centers, means to advance said centers to grip the work gear therebetween, and means for returning said carrier to position said work receiving portion in loading position after engagement of the work gear by said centers, said jaw yielding to clear the work gear on such return movement, said carrier having a ground gear receiving portion movable when said work gear receiving portion is in loading position into position to receive a ground gear released by said centers, and movable to discharge the previously ground gear therefrom when the carrier moves to position the next work gear between said centers.

19. In a gear grinder, a carrier comprising a work gear receiving portion including a rack section to receive a work gear in meshed relation, an anvil at one side of said rack section, and a clamping jaw on said carrier to clamp a work gear against said anvil in accurately located angular position; means for supplying a succession of work gears to said receiving portion when said carrier is in loading position; and means for moving said carrier to position a work gear in said receiving portion in position to be engaged by rotary work support means.

20. In a gear grinder, a carrier comprising a work gear receiving portion including a rack section to receive a work gear in meshed relation, an anvil at one side of said rack section, and a clamping jaw on said carrier to clamp a work gear against said anvil in accurately located angular position, means for supplying a succession of work gears to said receiving portion when said carrier is in loading position; and means for moving said carrier to position a gear in said receiving portion in position to be engaged by rotary work support means, said jaw being yieldable to provide for return movement of said carrier after the work gear has been engaged by the work support means.

21. A fully automatic high production gear grinding machine comprising a frame, a work slide mounted on said frame for reciprocation thereon, work slide traverse mechanism between said frame and work slide to reciprocate said work slide, a rotary work support on said work slide for supporting a work gear, a wheel slide having a rotary wheel support thereon mounted on said frame for movement in a path which moves said rotary wheel support generally radially of said rotary work support, cam mechanism connected between said frame and wheel slide operable to move a grinding wheel on said rotary wheel support rapidly from working to clearance position with respect to a work gear on said rotary work support at the end of a grinding stroke of said work slide, power actuated index mechanism operable while the grinding wheel is in clearance position to index said rotary work support, power actuated wheel trimming and compensating mechanism operable while said wheel slide is out of working position to trim the periphery of a grinding wheel on said rotary wheel support and to adjust the wheel slide relative to said cam mechanism to compensate for the change in size of the grinding wheel, a motor, and mechanical connections between said motor and said work slide traverse mechanism, said cam mechanism, and said index mechanism to operate all of said mechanisms in properly timed relation.

22. A fully automatic high production gear grinding machine comprising a frame, a work slide mounted on said frame for reciprocation thereon, work slide traverse mechanism between said frame and work slide to reciprocate said work slide, a rotary work support on said work slide for supporting a work gear, a wheel slide having a rotary wheel support thereon mounted on said frame for movement in a path which moves said rotary wheel support generally radially of said rotary work support, cam mechanism connected between said frame and wheel slide operable to move a grinding wheel on said rotary wheel support rapidly from working to clearance position with respect to a work gear on said rotary work support at the end of a grinding stroke of said work slide, power actuated index mechanism operable while the grinding wheel is in clearance position to index said rotary work support, power actuated wheel trimming and compensating mechanism operable while said wheel slide is out of working position to trim the periphery of a grinding wheel on said rotary wheel support and to adjust the wheel slide relative to said cam mechanism to compensate for the change in size of the grinding wheel, a motor, mechanical connections between said motor and said work slide traverse mechanism, said cam mechanism, and said index mechanism to operate all of said mechanisms in properly timed relation, and automatic loading mechanism including means to present a work gear in properly aligned position for engagement by said rotary work support means.

23. A grinder comprising a frame, a wheel slide movable on said frame, a trimmer movable on said wheel slide, a wheel slide bracket fixed to said wheel slide, a wheel slide nut journalled in said bracket, a wheel slide screw in said nut, and means for supporting said screw on said frame to support said wheel slide in operating position; a trimmer bracket fixed to said trimmer, a trimmer nut journalled in said trimmer bracket, a trimmer screw in said trimmer nut, and means for supporting said trimmer screw against axial displacement relative to said wheel slide; and means for driving both of said screws proportionally to effect equal adjustment of said trimmer on said wheel slide and of said wheel slide on said frame.

24. A grinder as defined in claim 23 comprising independent manually operated devices for adjusting said nuts in said brackets.

25. A grinder as defined in claim 24 in which the manually operated devices comprise worms driving worm gears effective to lock said nuts against rotation except when said worms are being rotated manually.

References Cited in the file of this patent

UNITED STATES PATENTS

| | | |
|---|---|---|
| 1,478,433 | Harris | Dec. 25, 1923 |
| 1,956,983 | De Vlieg | May 1, 1934 |
| 1,985,213 | Page | Dec. 18, 1934 |
| 2,066,220 | Orcutt | Dec. 29, 1936 |
| 2,524,541 | Praeg | Oct. 3, 1950 |
| 2,587,202 | Osplack | Feb. 26, 1952 |
| 2,597,648 | Lucas | May 20, 1952 |
| 2,649,032 | Moncrieff | Aug. 18, 1953 |
| 2,767,520 | Rudnicki | Oct. 23, 1956 |
| 2,944,373 | Mentley et al. | July 12, 1960 |

FOREIGN PATENTS

| | | |
|---|---|---|
| 486,981 | Great Britain | June 14, 1938 |